United States Patent
Sugihara

Patent Number: 5,902,207
Date of Patent: May 11, 1999

[54] OIL PRESSURE CONTROLLER FOR CONTINUOUSLY VARIABLE TRANSMISSION

[75] Inventor: Jun Sugihara, Yokosuka, Japan

[73] Assignee: Nissan Motor Co., Ltd., Yokohama, Japan

[21] Appl. No.: 08/974,424

[22] Filed: Nov. 19, 1997

[30] Foreign Application Priority Data

Nov. 19, 1996 [JP] Japan .................................. 8-308331

[51] Int. Cl.⁶ ......................... F16H 61/30; B60K 41/12
[52] U.S. Cl. ................ 476/10; 475/127; 477/50
[58] Field of Search ................ 476/10; 477/50; 475/127, 128, 214, 216

[56] References Cited

U.S. PATENT DOCUMENTS

| | | | |
|---|---|---|---|
| 5,136,890 | 8/1992 | Hibi et al. | 476/10 |
| 5,464,375 | 11/1995 | Nakano | 476/10 |

FOREIGN PATENT DOCUMENTS

| | | | |
|---|---|---|---|
| 6-257661 | 9/1994 | Japan . | |
| 7-198015 | 8/1995 | Japan . | |
| 2256684 | 12/1992 | United Kingdom | 476/10 |

*Primary Examiner*—Charles A. Marmor
*Assistant Examiner*—Marcus Charles
*Attorney, Agent, or Firm*—Foley & Lardner

[57] ABSTRACT

Two speed change units of a continuously variable transmission for a vehicle are accommodated in chambers partitioned by an intermediate wall in a casing. Oil pan is fitted to the underside of the casing in order to store lubricating oil for the units. A strainer for filtering the lubricating oil is disposed in the oil pan. A controller comprising a control valve driven by an actuator via a speed change link, a cam and a feedback link is provided for controlling the speed change ratio of the speed change units. The actuator is disposed further towards the rear of the vehicle body than the intermediate wall. The control valve, feedback link and cam are disposed further towards the front of the vehicle body than the intermediate wall. This arrangement avoids the interference of the actuator and the strainer.

1 Claim, 9 Drawing Sheets

OIL PRESSURE CONTROLLER FOR CONTINUOUSLY VARIABLE TRANSMISSION

FIELD OF THE INVENTION

This invention relates to oil pressure control of a toroidal type continuously variable transmission used for a vehicle.

BACKGROUND OF THE INVENTION

Figure 9:
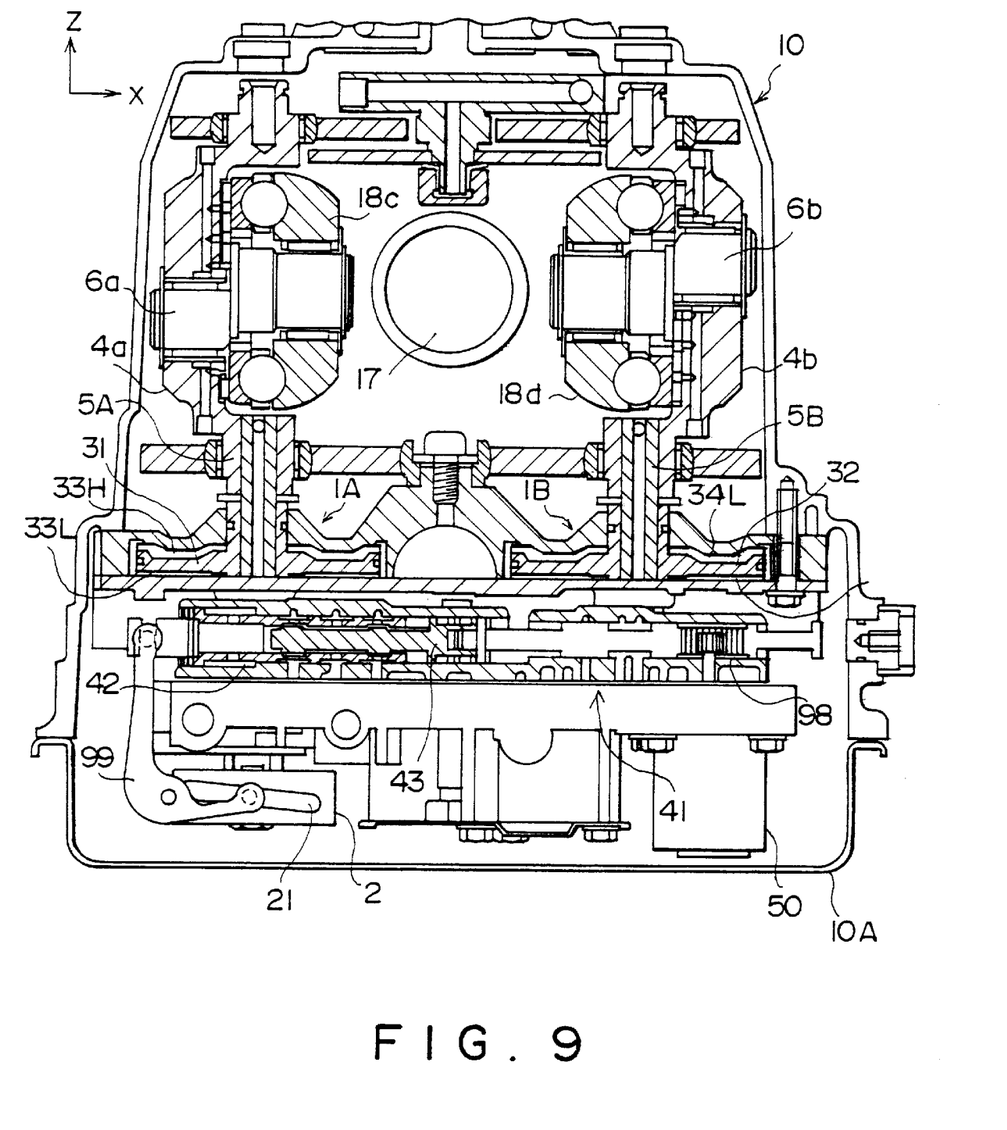
FIG. 9 is a cross-sectional view of a toroidal type continuously variable transmission according to a prior art.

In a toroidal type continuously variable transmission for a vehicle, speed control has been performed using oil pressure, as indicated for example in Tokkai Hei 6-257661 published by the Japanese Patent Office in 1994. This continuously variable transmission is a so-called double cavity type transmission in which two sets of toroidal gearing units are arranged parallel to each other. One unit possesses a pair of power rollers 18c and 18d inside a casing 10 as shown in FIG. 9. The power rollers 18c and 18d are supported by a pair of trunnions 4a, 4b via eccentric axes 6a, 6b such that they are free to rotate.

The power rollers 18c and 18d are gripped by the input disk and the output disk which are not shown in the drawing, and an arbitrary speed change is achieved by varying a gyration angle around the Z axis according to a displacement in the Z axis direction shown in the figure of the trunnions 4a and 4b.

The trunnion 4a is driven in the Z axis direction via a trunnion axis 5A by an oil pressure servo-cylinder 1, and the trunnion 4b is driven in the Z axis direction by an oil pressure servo-cylinder 1B.

The oil pressure servo-cylinder 1A comprises a piston 31 joined to the trunnion axis 5A.

The piston 31 is displaced together with the trunnion axis 5A in the Z axis direction according to a differential pressure of upper and lower oil chambers 33L, 33H. The trunnion axis 5A rotates together with the trunnion 4a around the Z axis according to gyrational displacements of the power roller 18c.

The oil pressure servo-cylinder 1B is operated in the same way as the oil pressure servo-cylinder 1A by the piston 32, and oil chambers 34L, 34H.

A hydraulic fluid is supplied through a control valve 41 to each of the above-mentioned oil chambers. The control valve 41 is housed inside an oil pan 10A joined to the lower part of the casing 10.

The control valve 41 comprises a spool 43 which is displaced by a step motor 50 in the X axis direction of the figure. The spool 43 is inserted inside a shaft sleeve 42, either of the oil chambers 33L, 33H or 34L, 34H being connected to an oil pressure pump and either of the oil chambers 33L, 33H, or 34L, 34H being connected to a drain according to the relative displacement of the spool 43 and shaft sleeve 42. In this way, the power rollers 18c and 18d are always displaced in the up/down direction of the figure centered on the rotation axis 17 of input/output disks.

The lower end of the trunnion axis 5A supporting the power roller 18c projects inside the oil pan 10A. At the lower end of this trunnion axis 5A, a precess cam 2 having a guide groove 21 inclined at a predetermined angle is installed. The precess cam 2 converts the rotational displacement of the trunnion axis 5A around the Z axis into a displacement in the Z axis direction, and transmits this to an L type link 99. The L type link 99 is joined to the shaft sleeve 42, so the displacement in the Z axis direction is converted into a displacement in the X axis direction which is transmitted to the sleeve 42. In this way, the gyration angle of the power roller 18c is fed back to the control valve 41.

The other toroidal speed change unit of the continuously variable transmission has an input axis 17 and output axis which are common with the aforesaid unit, and it varies the gyration angle under oil pressure control based on the feedback of the common control valve 41 and gyration angle of the power roller 18c.

In this continuously variable transmission, the control valve 41 is installed between the two speed change units when viewed from the Z axis direction of FIG. 9. This is due to the fact that the four trunnion axes project inside the oil pan 10A in order that these trunnion axes do not interfere with the control valve 41. The step motor 50 is arranged so that its rotation axis is parallel to the Z axis as shown in FIG. 9, and it drives the spool 43 via a rack-and-pinion gear 98.

However, this arrangement of the step motor 50 is a factor in increasing the depth of oil pan 10A. If the rotation axis of the step motor 50 is arranged to be parallel to a plane containing the X axis and Y axis when the rotation axis 17 of the transmission is the Y axis, the oil pan 10A need not to be deepened, but in such an arrangement of the step motor 50, the motor interferes with the trunnion axis as described above, which is undesirable.

Also, to increase the speed change rate of the transmission, the capacity of the step motor must be large, but the capacity increase of the step motor increases the dimensions of the transmission in the Z axis direction, i.e. the up/down direction, and this results in a smaller clearance between the oil pan and the ground.

In this context, Tokkai Hei 7-198015 published by the Japanese Patent Office in 1995, discloses a continuously variable transmission which has a step motor and a spool valve arranged horizontally in parallel with each other.

This arrangement was enabled by connecting the rotation axis of the step motor and the spool of the spool valve via a link and a screw mechanism.

However, even in this case, there is still a possibility that the horizontally arranged step motor interferes with a strainer disposed in the oil pan.

SUMMARY OF THE INVENTION

It is therefore an object of this invention to avoid the interference of a horizontally arranged step motor and strainer in a continuously variable transmission.

In order to achieve the above object, this invention provides an oil pressure controller for use with a toroidal type continuously variable transmission for a vehicle.

The transmission comprises a casing, an intermediate wall provided in the casing, a pair of speed change units, oil pressure cylinders for varying a speed change ratio of the speed change units, an oil pan fitted to an underside of the casing in order to store lubricating oil for the speed change units, a strainer disposed in the oil pan for filtering the lubricating oil. The speed change units are respectively accommodated in chambers partitioned by the intermediate wall in the casing.

The controller comprises a control valve for controlling an oil pressure supplied to the oil pressure cylinders, an actuator, a speed change link for connecting the actuator and the control valve. The control valve varies an oil pressure control state according to a displacement position of the speed change link. The controller further comprises a cam for converting an operation state of one of the speed change units into an unidirectional linear displacement, and a feedback link for varying a displacement amount of the speed change link according to an amount of the aforesaid unidirectional linear displacement, The actuator is disposed further towards the rear of a vehicle body than the intermediate wall, and the control valve, feedback link and cam are disposed further towards the front of said vehicle body than said intermediate wall.

The details as well as other features and advantages of this invention are set forth in the remainder of the specification and are shown in the accompanying drawings.

DESCRIPTION OF THE PREFERRED EMBODIMENTS

Figure 1:
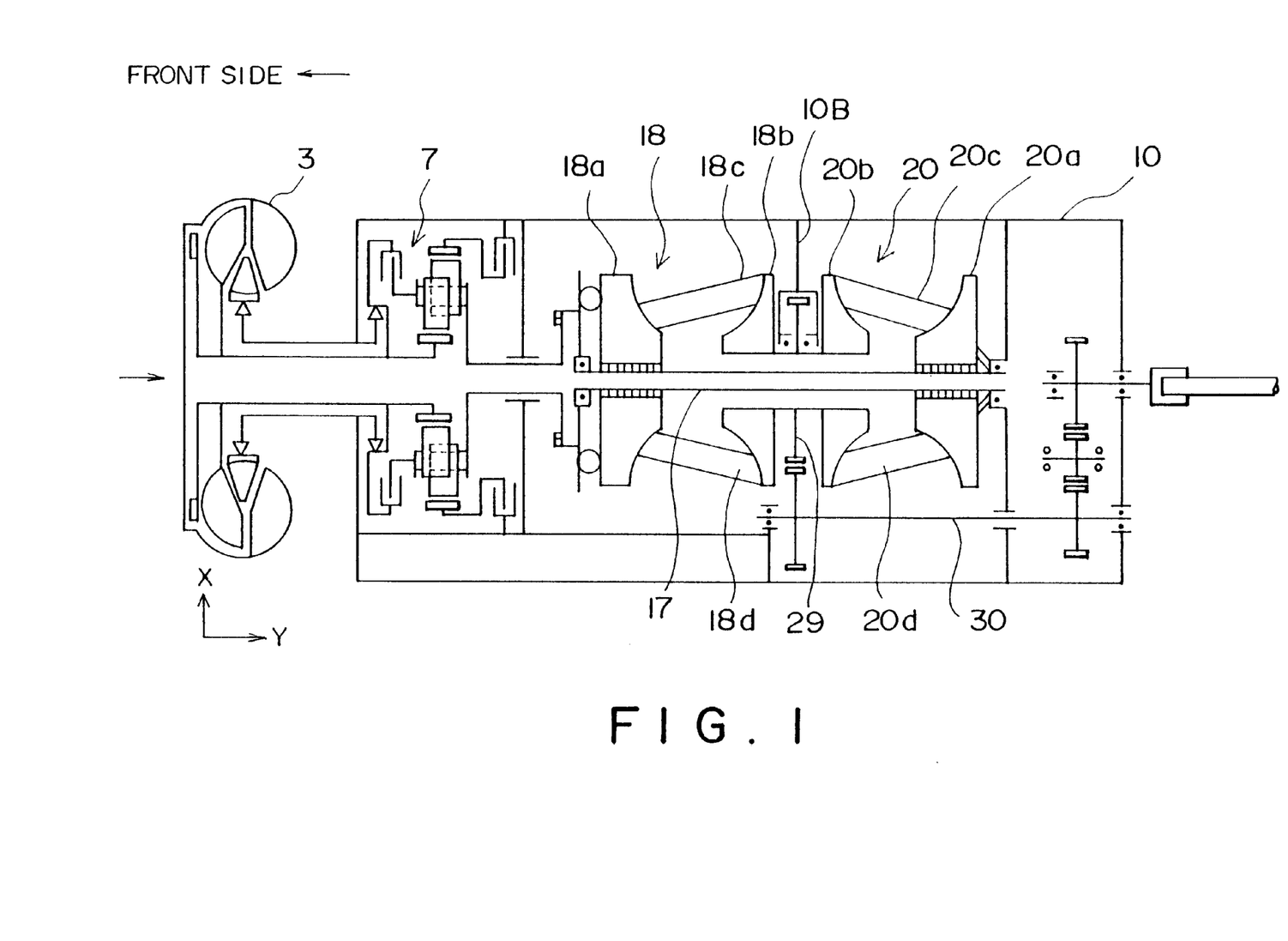
FIG. 1 is a schematic plan view of a toroidal type continuously variable transmission according to this invention.

Referring to FIG. 1 of the drawings, an output of a vehicle engine is input to an input axis 17 of a toroidal type continuously variable transmission via a torque-converter 3 and forward/reverse change-over device 7.

The continuously variable transmission comprises a first speed change unit 18 and a second speed change unit 20. The first speed change unit comprises an input disk 18a and output disk 18b, and the second speed change unit 20 comprises an input disk 20a and output disk 20b.

A pair of power rollers 18c, 18d are gripped between the input disk 18a and output disk 18b. A pair of power roller 20c, 20d are gripped between the input disk 20a and output disk 20b.

The support structure of these power rollers is identical to that of the prior art. The output disks 18b, 20b are joined to an output gear 29. The output gear 29 is supported free to rotate in an intermediate wall 10B formed by the casing 10, and it transmits the output of the transmission by engaging with a gear of the output axis 30.

Figure 2:
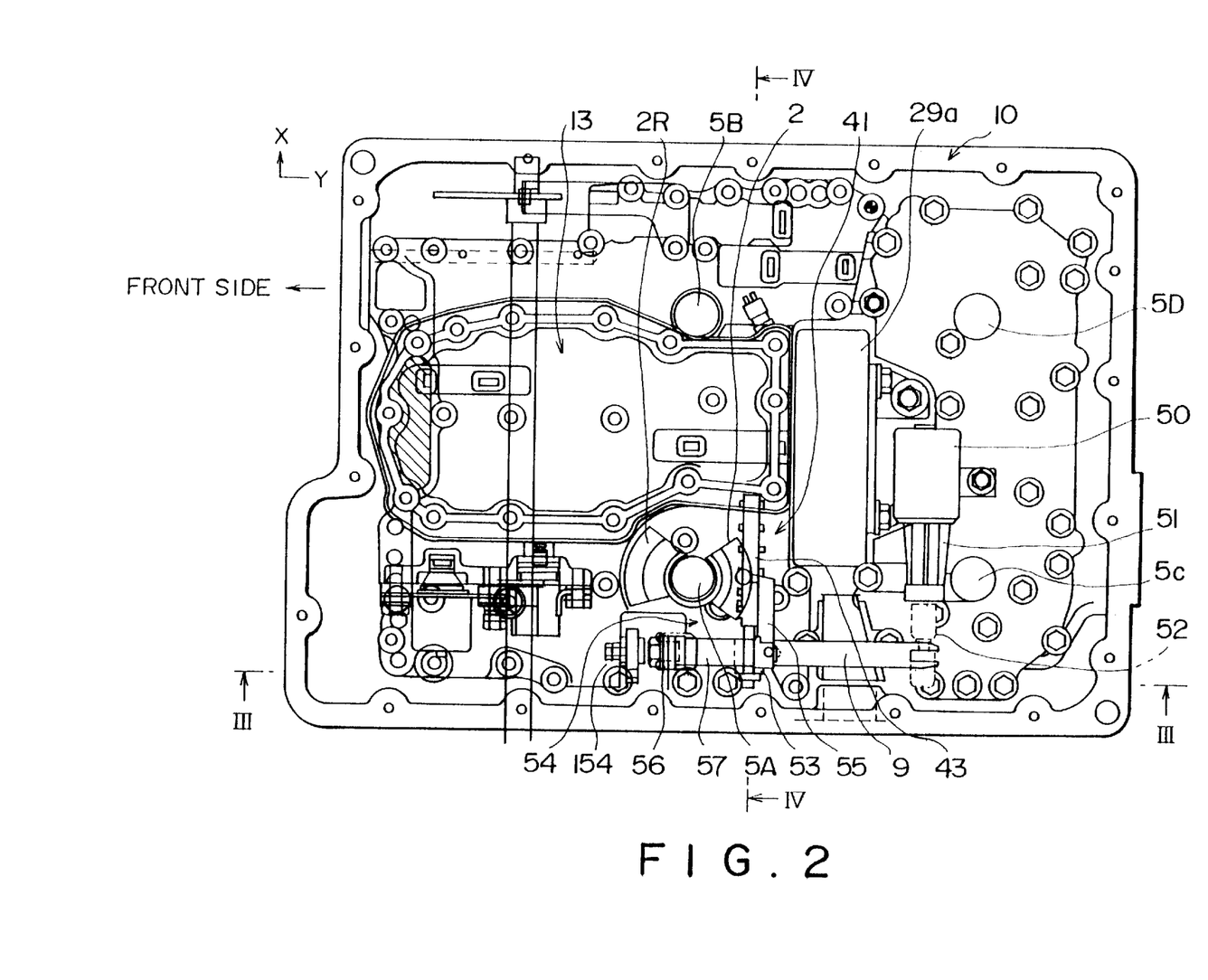
FIG. 2 is a plan view of the continuously variable transmission viewed from underneath with an oil pan removed.

FIG. 2 is the plan of the continuously variable transmission viewed from underneath with the oil pan 10A removed.

The four trunnion axes 5A–5D project into the oil pan 10A from the casing 10. A forward precess cam 2 and reverse precess cam 2R are installed at one end of the trunnion axis 5A supporting the power roller 18c. The trunnion axis 5B supports the power roller 18d, the trunnion axis 5C supports the power roller 20c, and the trunnion axis 5D supports the power roller 20d, respectively.

A gear cover 29a covering the output gear 29 is installed in the X axis direction of the figure between the trunnion axes 5A, 5B and the trunnion axes 5C, 5D.

The X axis direction coincides with the width direction of the vehicle. The gear cover 29a comprises a part of the intermediate wall 10B of the casing 10 which is shown in FIG. 1.

Figure 3:
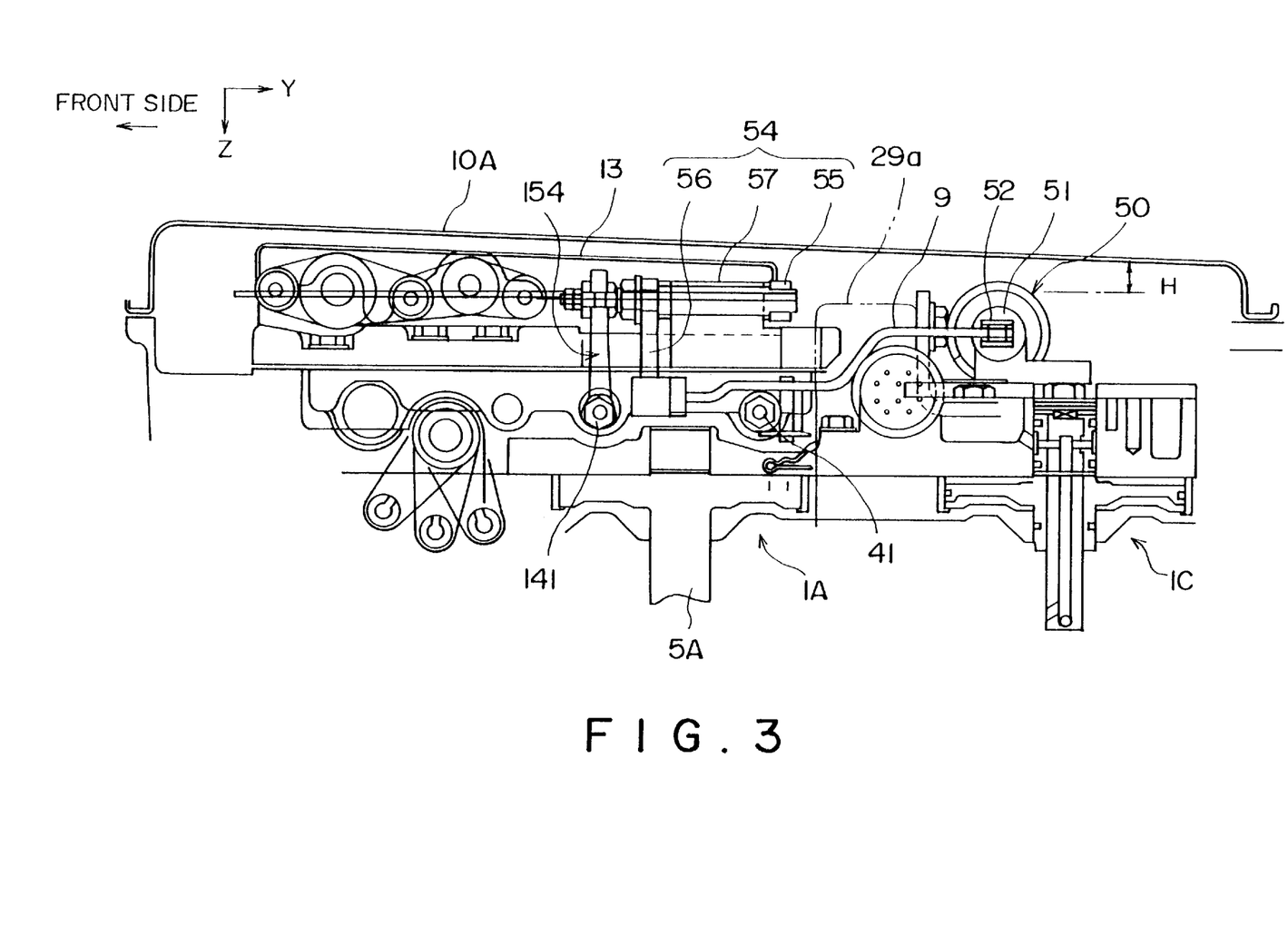
FIG. 3 is a cross sectional view of the essential parts of a continuously variable transmission taken along a line III—III in FIG. 2.

The control valve 41 which controls the speed change ratio of the vehicle when it moves forward is installed further towards the front of the vehicle than the gear cover 29a, as shown in FIG. 2 and FIG. 3. In other words, the control valve 41 is disposed in the width direction of the vehicle between the intermediate wall 10B and the trunnion axis 5A.

The arrangement of the motor 50 differs from the aforesaid prior art example in that it is installed between the gear cover 29a and trunnions 5C, 5D such that it is parallel with the X axis, as shown in FIG. 2. In other words, the step motor 50 is disposed further towards the rear of the vehicle than the intermediate wall 10B. The rotation of the step motor 50 is converted into a back and forth linear motion by a lead screw mechanism 51 shown in FIG. 5, and is transmitted to a slider 52.

Figure 5:
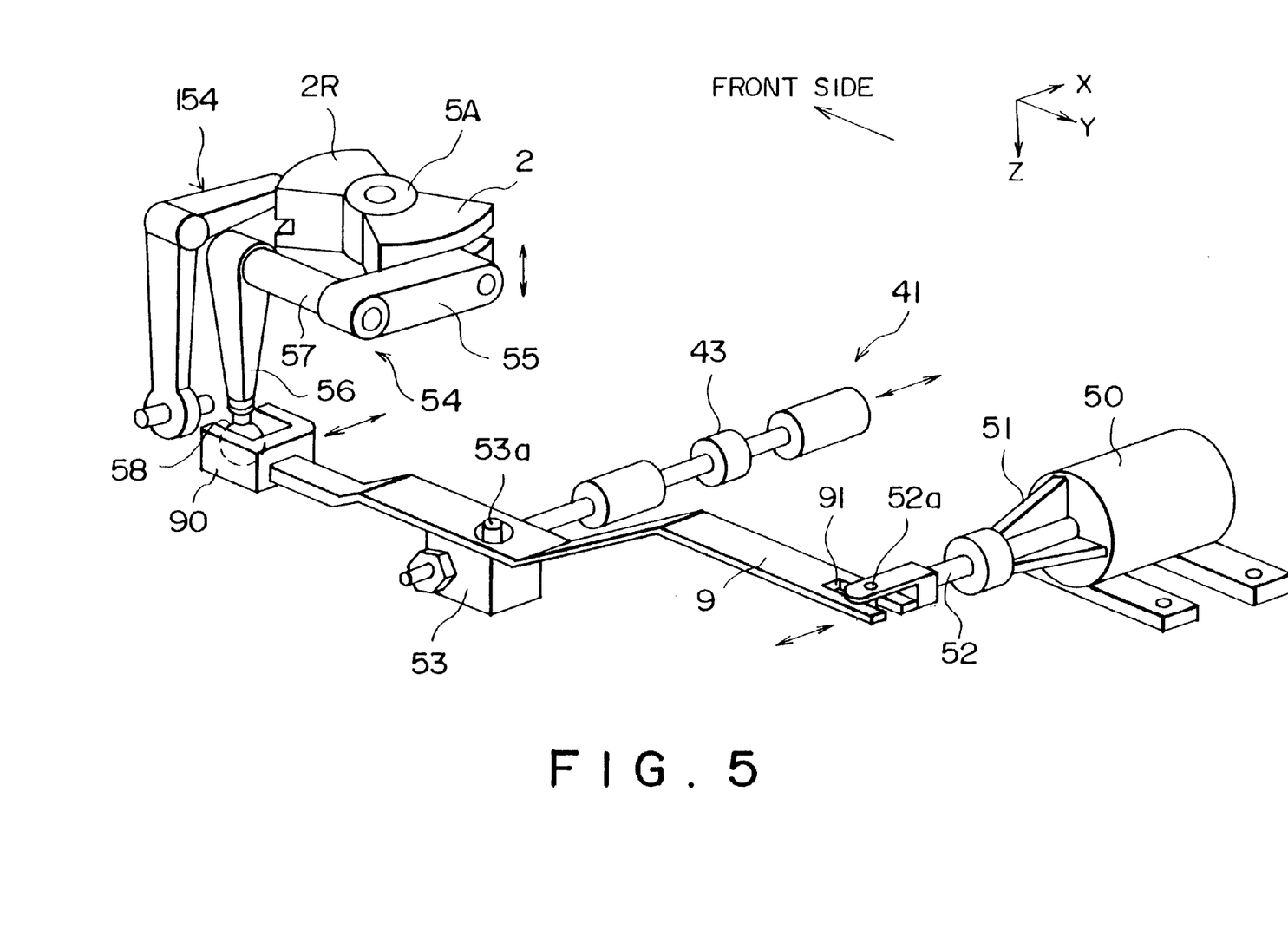
FIG. 5 is a perspective view of a control mechanism of a control valve according to this invention.

The slider 52 is joined to a pin 52a at one end 91 of a link 9 supported free to swing on a rocker shaft 53a in a horizontal plane containing the X axis and Y axis. An intermediate part of the link 9 is joined to the spool 43 of the control valve 41 via a connection member 53.

Figure 6:
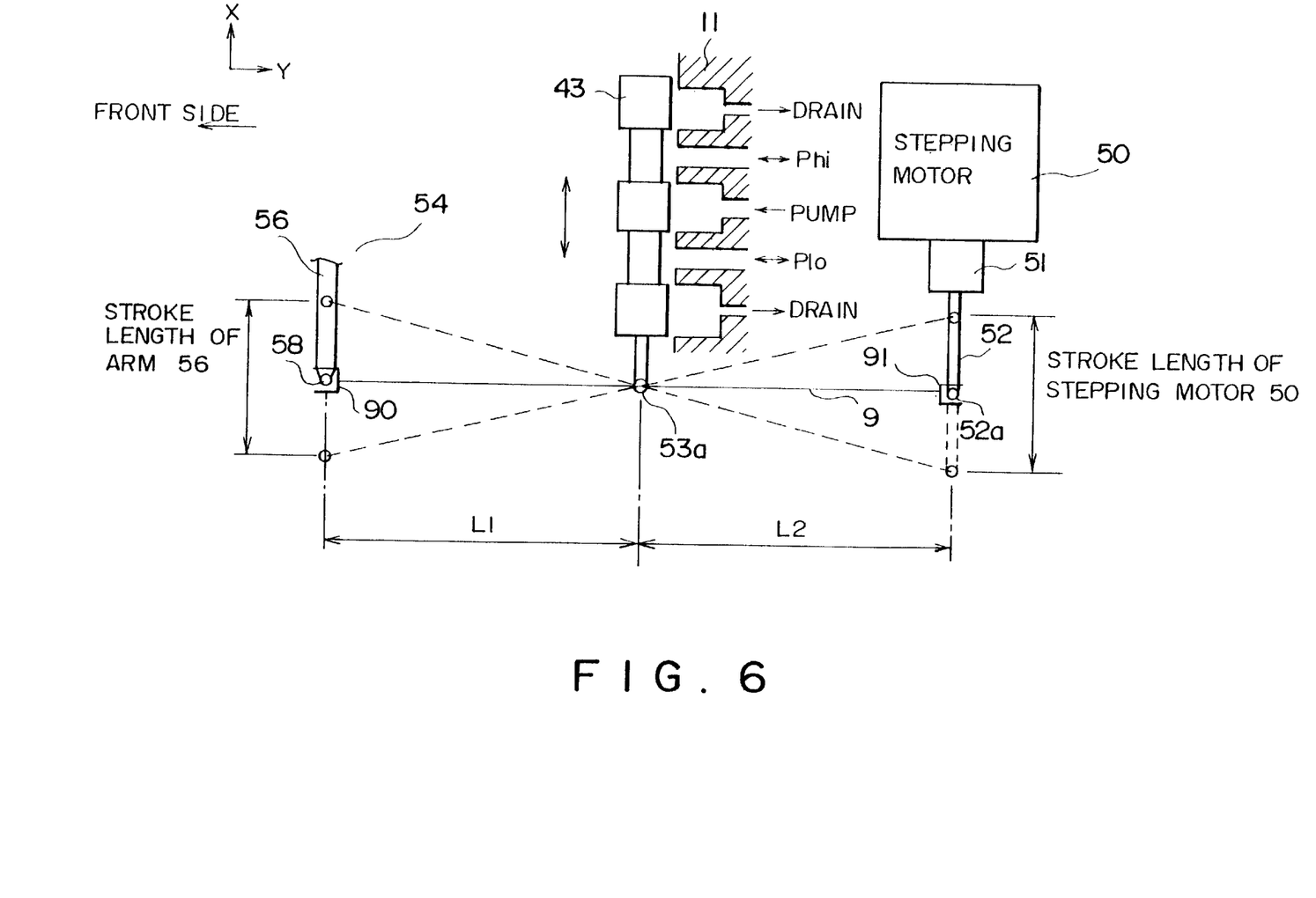
FIG. 6 is a block diagram of the control mechanism describing the action thereof.

As shown in 6, the spool 43 is housed inside a fixed valve case 11, and a port and drain are selectively connected to ports Phi and Plo according to a displacement in the X axis direction of the spool 43.

The port Phi is connected to an oil chamber driving the power rollers in the increase direction of the speed change ratio, and the port Plo is connected to an oil chamber driving the power rollers in the decrease direction of the speed change ratio.

The other end 90 of the speed change link 9 is connected by a feedback link 54 to the precess cam 2.

As shown in FIG. 5, the feedback link 54 converts a displacement of a guide groove 21 of the precess cam 2 in the Z axis direction to a back-and-forth linear movement in the X axis direction. At one end of an arm 55 which is disposed in the X axis direction, a projection which engages in the guide groove 21 is formed on one side of the precess cam 2. The base end of the arm 55 is joined to a rocker shaft 57 which is disposed in the Y axis direction.

The rocker shaft 57 is joined to an arm 56 disposed in the Z axis direction, and a spherical connecting piece 58 joined to the end 90 of the U-shaped link 9 is formed at the tip of the arm 56.

The precess cam 2 and feedback link 54 comprise a feedback mechanism which transmits the gyration of the power roller 18c to the control valve 41. The drive mechanism of the power rollers via the control valve 41 is identical to that of the prior art described hereintofore.

A control valve 141 for reverse motion is provided in addition to the control valve 41 for forward motion. A gyration angle variation of the power roller 18c is fed back via the precess cam 2R for reverse motion and a feedback link 154 for reverse motion, to a speed change control valve L-shaped link 991. As the mechanism of the feedback mechanism for reverse motion is identical to that of the feedback mechanism for forward motion, its description is omitted herein.

The drive of the step motor 50 is performed based on a signal output by a control unit, not shown.

Due to the output signal from the control unit, the step motor 50 rotates, and for example causes a slider 52 to extend as shown by the broken line of FIG. 6.

A speed change link 9 rotates about the spherical connecting piece 58 according to an extension of the slider 52, and a spool 43 displaces toward the lower part of the figure. This connects a pump port of the valve body 11 to the port Phi, and connects a drain port to the port Plo. As a result, the gyration angles of the power rollers 18c, 18d, and 20c, 20d increase, and the precess cam 2 provided on the trunnion axis 5A of the power roller 18c causes the end 91 of the speed change link 90 to move towards the upper part of FIG. 6 via a feedback link 54.

The spool 43 of the control valve 41 then displaces to the upper part of FIG. 6 according to the displacement of this feedback link 54, and stops at a position wherein the port Phi and port Plo close. In this way, a target speed change ratio and a true speed change ratio according to the gyration angel of the power roller 18c are made to coincide. The total length of the speed change link 9 is therefore set as follows.

In FIG. 6, if a distance from the connecting part 58 of the feedback link 54 to the rocker shaft 53a is L1, and a distance from the rocker shaft 53a to the pin 52a is L2, a lever ratio L1/L2 is set to a value according to a stroke of the step motor 50, feedback link 54 and spool 43.

When the output signal from the control unit commands a decrease of gyration angle, the step motor 50 and feedback link 54 operate in the reverse direction to that described above.

In this continuously variable transmission, the step motor 50 is arranged further towards the rear of the vehicle body than the intermediate wall 10B as shown in FIGS. 2 and 3, and, the speed control valve 41 is arranged further towards the front of the vehicle body than the intermediate wall 10B.

Figure 4:
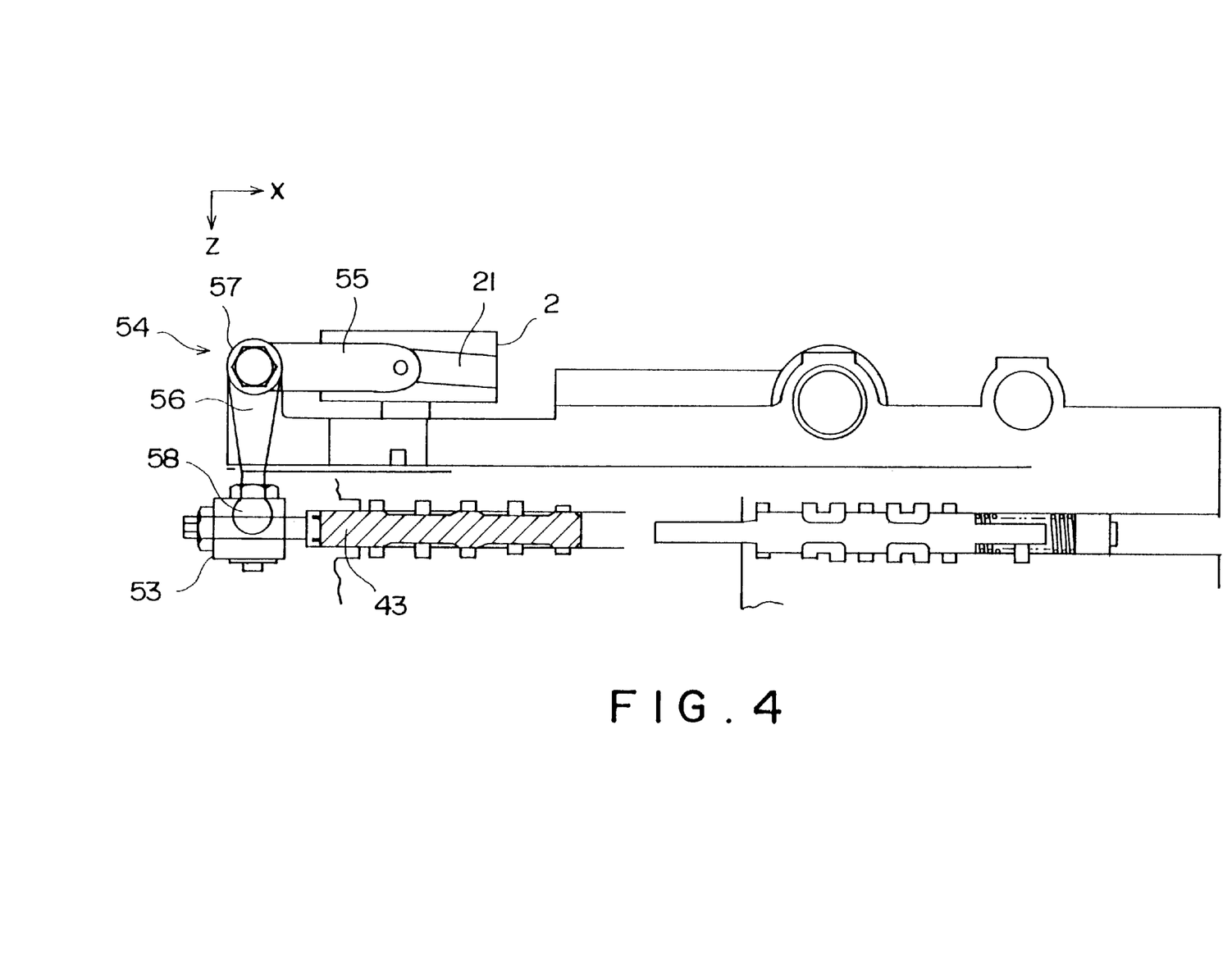
FIG. 4 is a cross sectional view of the essential parts of a continuously variable transmission taken along a line IV—IV in FIG. 2.

Accordingly, the length of the step motor 50 in the axial direction does not affect the depth of the oil pan 10A. Moreover even when the size of the step motor 50 is increased to improve the speed change rate, a gap H shown in FIG. 3 may easily be ensured between the oil pan 10A and a lower surface of the step motor 50 without much affecting the depth of the oil pan 10A It should be noted that the FIGS. 3 and 4 are drawn upside down so as to correspond to FIG. 2.

Due to the above arrangement, increase in the overall height of the continuously variable transmission is therefore suppressed, and the minimum clearance between the oil pan 10A and the ground may easily be maintained even using a large step motor.

As the step motor does not project far into the oil pan 10A, a strainer 13 in the oil pan 10A is not obstructed, and sufficient surface area for the strainer can be ensured. Unlike the prior art, a sleeve is not required for the control valve 41, so increase of production costs can be suppressed even when, for example, the feedback link 54 is added. As a sleeve is not used, leak of hydraulic fluid from the control valve 41 is also decreased. This has a desirable effect on the precision of oil pressure control.

Figure 7:
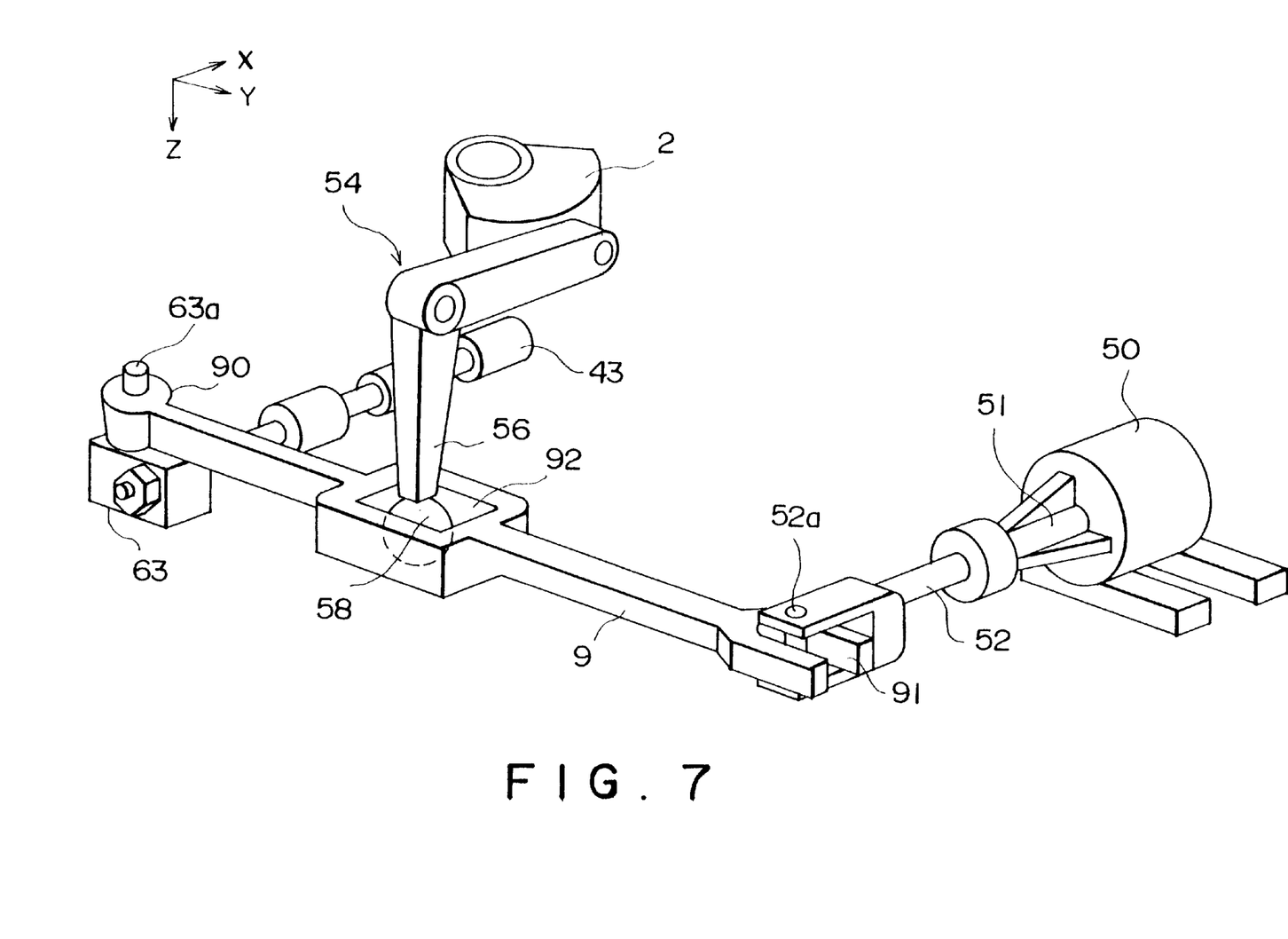
FIG. 7 is a perspective view of the control mechanism of the control valve according to a second embodiment of this invention.
Figure 8:
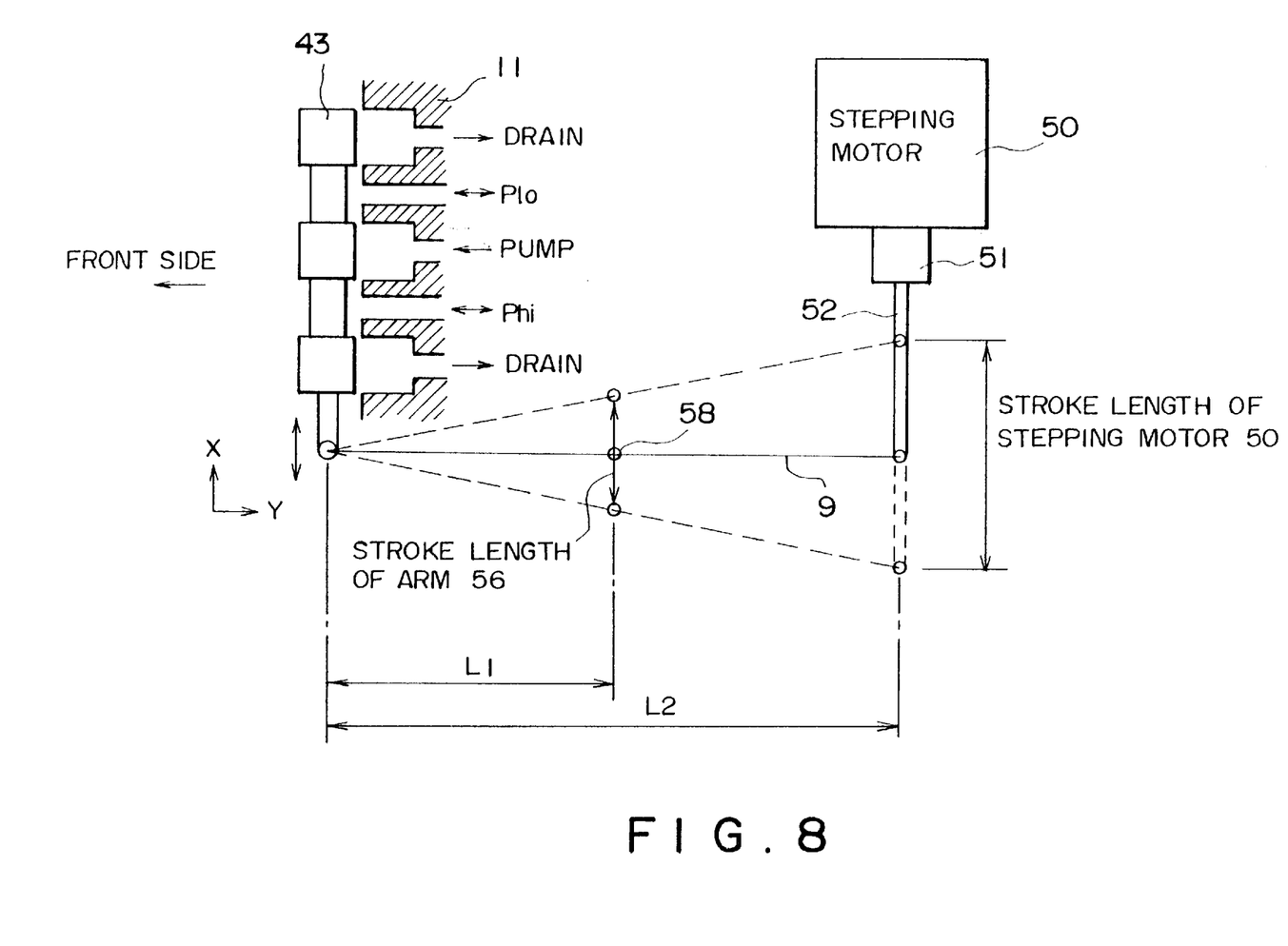
FIG. 8 is a block diagram of the control mechanism describing the action thereof according to the second embodiment.

FIGS. 7 and 8 show a second embodiment of this invention.

According to this embodiment, the positions of the precess cam 2 and control valve 41 of the first embodiment described above are reversed. The remaining features of the construction are identical to those of the first embodiment.

The end 91 of the speed change link 9 is connected to the step motor 50 via the pin 52a as in the first embodiment heretofore described. The other end 90 of the speed change gearing link 9 is connected to the spool 43 via a pin 63a of a connecting part 63.

The spherical connecting part 58 of the feedback link 54 engages with an engaging part 92 provided midway along an intermediate part of the speed change link 9.

The action of the speed change mechanism is identical to that of the first embodiment heretofore described excepting that the drive direction of the speed change link 9 by the feedback link 54 is reversed with respect to the first embodiment.

According also to this embodiment, the lever ratio L1/L2 of the speed change link 9 is set according to the stroke of the step motor 50, feedback link 54 and spool 43.

According to this embodiment, the control valve 41 is disposed further towards the front of the vehicle body than the trunnion 5A, and the step motor 50 is disposed further towards the rear of the vehicle body than the intermediate wall 10B as in the aforesaid first embodiment.

According to this embodiment, the spool 43 of the speed change control valve 41 is connected to the end 91 of the speed change link 9, and as the feedback link 54 is connected midway along the speed change link 9, the stroke of the spool 43 is larger than in the case of the first embodiment, the effect of error in the machining precision of the control valve 41 is relatively less and speed change control precision is improved.

The embodiments of this invention in which an exclusive property or privilege is claimed are defined as follows:

1. An oil pressure controller for use with a toroidal type continuously variable transmission for a vehicle, said transmission comprising a casing, an intermediate wall provided in the casing, said intermediate wall partitioning said casing into two chambers, a pair of speed change units respectively accommodated in the chambers, oil pressure cylinders for varying a speed change ratio of the speed change units, an oil pan fitted to an underside of the casing in order to store lubricating oil for the speed change units, a strainer disposed in the oil pan for filtering the lubricating oil, said controller comprising:

a control valve for controlling an oil pressure supplied to said oil pressure cylinders, an actuator, a speed change link for connecting said actuator and said control valve, said control valve varying an oil pressure control state according to a displacement position of said speed change link, a cam for converting an operation state of one of the speed change units into a linear displacement, and a feedback link for varying a displacement amount of said speed change link according to an amount of said unidirectional linear displacement, wherein said actuator is disposed further towards the rear of a vehicle body than the intermediate wall, and said control valve, feedback link and cam are disposed further towards the front of said vehicle body than said intermediate wall.

* * * * *